United States Patent [19]
Tsoffka

[11] Patent Number: 5,847,482
[45] Date of Patent: Dec. 8, 1998

[54] ELECTROMAGNETIC MOTOR

[75] Inventor: Vladimir Tsoffka, Brooklyn, N.Y.

[73] Assignee: Technology Commercialisation Corporation, New York, N.Y.

[21] Appl. No.: 856,672

[22] Filed: May 15, 1997

[51] Int. Cl.$^6$ .................................................. H02K 21/26
[52] U.S. Cl. ............................................................. 310/154
[58] Field of Search ................................. 310/154, 181, 310/261

[56] References Cited

U.S. PATENT DOCUMENTS

| | | | |
|---|---|---|---|
| 4,237,397 | 12/1980 | Mohr et al. | 310/154 |
| 4,471,252 | 9/1984 | West | 310/154 |
| 4,823,037 | 4/1989 | Abukawa et al. | 310/154 |
| 5,089,737 | 2/1992 | Abukawa et al. | 310/154 |
| 5,091,667 | 2/1992 | Tomite | 310/154 |

FOREIGN PATENT DOCUMENTS 1755721  8/1992  U.S.S.R. .

Primary Examiner—Clayton E. LaBalle
Attorney, Agent, or Firm—Ilya Zborovsky

[57] ABSTRACT

An electromagnetic motor has a rotor rotatable about an axis and having a plurality of electromagnets arranged on its periphery and spaced from one another in a peripheral direction, a stator surrounding the rotor and including a plurality of permanent magnets spaced from one another in a peripheral direction and also spaced from an outer surface of the rotor so that a distance between each of the permanent magnets of the stator and the outer surface of the rotor decreases in direction of rotation of the rotor, and a plurality of metal screening elements each located forwardly of a front end of each permanent magnet of the stator as considered in direction of rotation of the rotor.

3 Claims, 2 Drawing Sheets

ELECTROMAGNETIC MOTOR

BACKGROUND OF THE INVENTION

The present invention relates to electromagnetic motors.

More particularly, it relates to an electromagnetic motor which has a drum type rotor provided with a plurality of circumferentially spaced electromagnets, and a stator having a plurality of permanent magnets circumferentially spaced from one another. One similar electromagnetic motor is disclosed in my U.S. Pat. No. 5,585,680. This motor can be further improved as to its efficiency.

SUMMARY OF THE INVENTION

Accordingly, it is an object of present invention to provide an electromagnetic motor which has a rotor rotatable about an axis and provided with a plurality of electromagnets arranged on a periphery and spaced from one another in a peripheral direction, a stator including a plurality of permanent magnets surrounding the rotor and spaced from one another in a circumferential direction, so that when the electromagnets are supplied with current the rotor rotates in a direction of rotation under the action of interaction between the electromagnets and the permanent magnets and a plurality of screening metal elements each arranged forwardly of a front end of a respect of one of the permanent magnets of the stator as considered in the direction of rotation of the rotor.

When the electromagnetic motor is designed in accordance with the present invention, it has an increased efficiency since the rotation of the rotor is performed in a more efficient way due to the pushing action by the permanent magnets of the stator on the electromagnets of the rotor without a negative interference. In a prior art, electromagnetic motor, when the electromagnet of the rotor passes the forward end of the permanent magnet of the stator, the current supply is interrupted and because of this the core of the electromagnet is attracted to the forward end of the stator permanent magnet, thus reducing the pushing force of the forward end of the permanent magnet of the stator acting on the electromagnet of the rotor. When in accordance with the present invention, the metal screening element is arranged forwardly of the front end of the stator and attracts the electromagnets when supplied with current, and when the electromagnets are turned off, the core of the electromagnet is no longer attracted to the metal screening element or the forward end of the permanent magnet of the stator, and the rotor continues its rotation in the most efficient way.

In addition, when the electromagnets are currentless, and in a position past the metal screening element in direction of rotation, the core of the electromagnet is attracted to the next stator permanent magnet.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
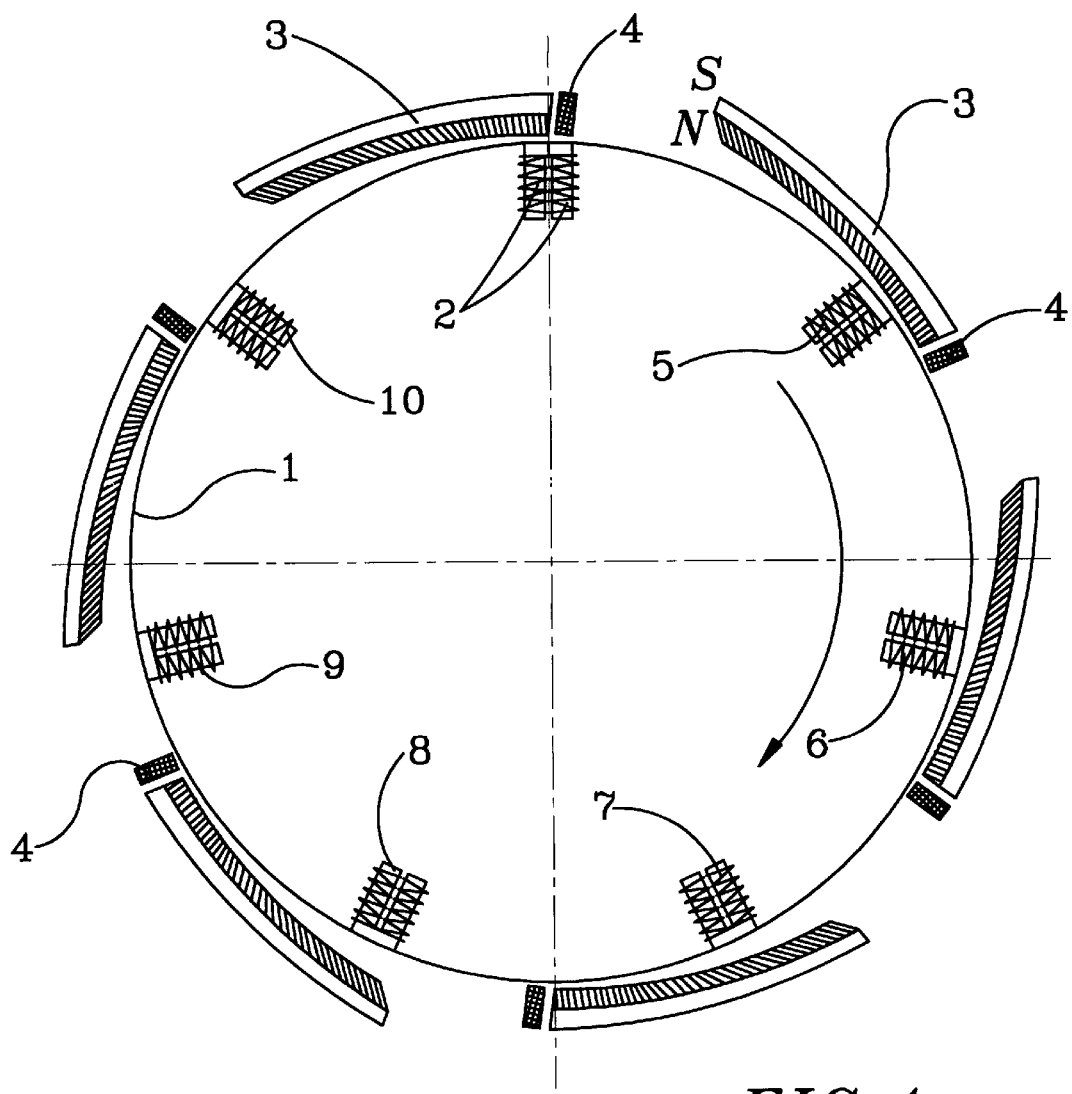
FIG. 1 is a view schematically showing an electromagnet motor in accordance with the present invention.
Figure 2:
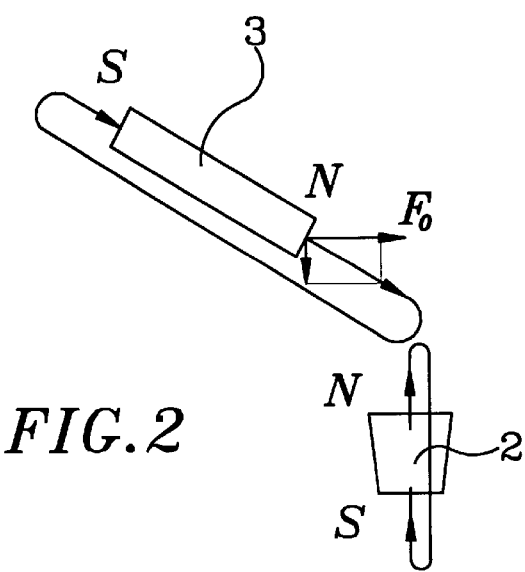
FIG. 2 is a view showing a diagram of magnetic fields of a stator permanent magnet and a rotor electromagnet when supplied with current of the inventive electromagnetic motor.
Figure 3:
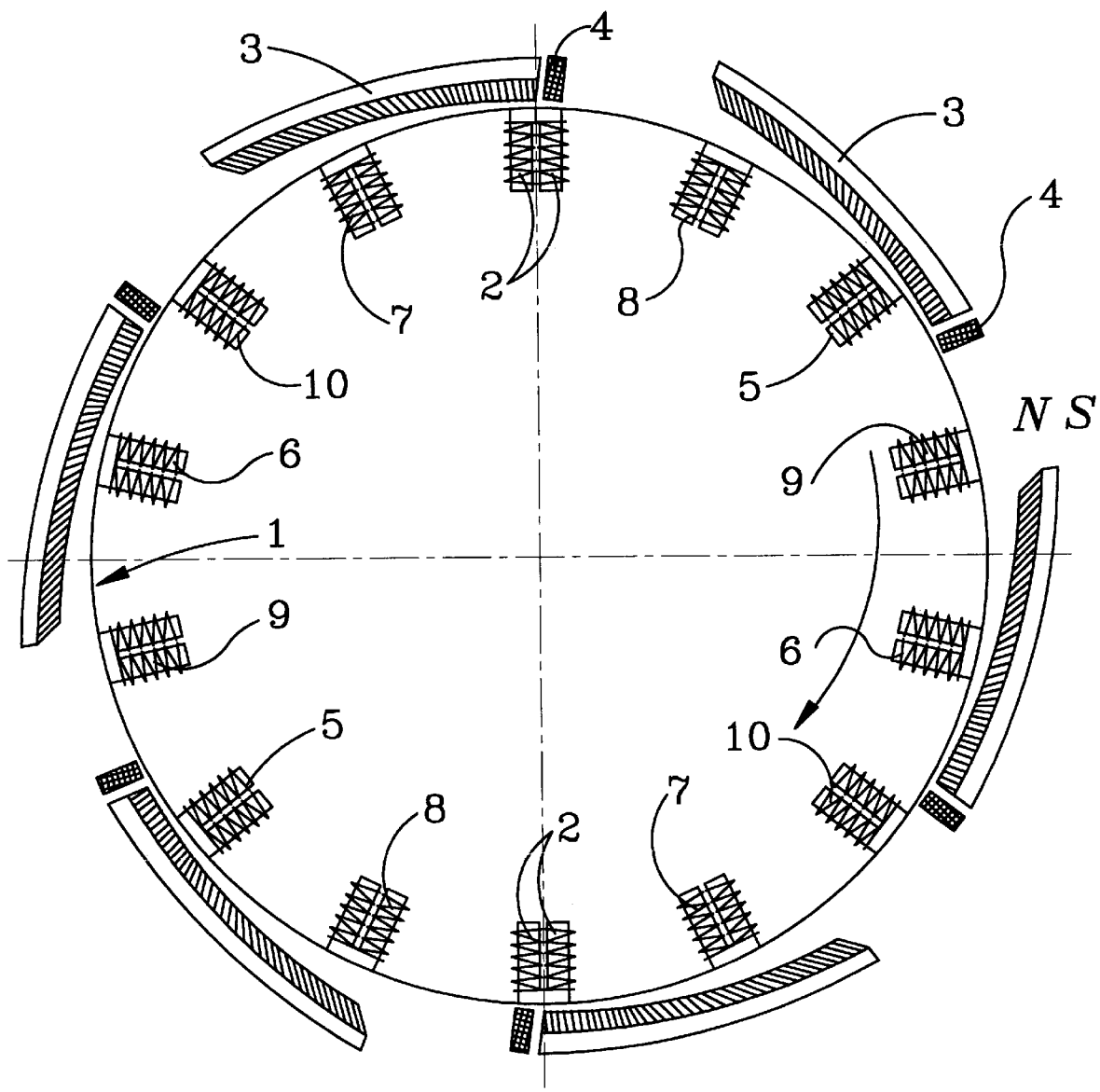
FIG. 3 is a view showing a further modification of the inventive electromagnetic motor, where the number of groups of electromagnets is doubled.

An electromagnetic motor in accordance with the present invention has a drum-type type rotor which is identified with reference numeral 1 and provided with a plurality of electromagnets 2 or more particularly a plurality of groups of electromagnets 2. The electromagnet motor further has a stator provided with a plurality of permanent magnets 3. The permanent magnets 3 are arranged so that a distance between the permanent magnet and the outer surface of the rotor reduces in direction of rotation of the rotor. For example, if the number of the permanent magnets of the stator 3 is 6, the distance between the permanent magnet and the rotor can vary from 0.1 mm at the front end to 50.0 mm at the rear end as considered in direction of rotation of the rotor, depending on a size of the electromagnetic motor.

Each electromagnet of each group of electromagnets 2 of the rotor 1 is connected to a current supply distributor which is not shown in the drawings. The distributor can be similar to a distributor utilized in an automobile. Carbon brushes can be arranged to provide current to the electromagnets in the dead points, or in other words in the points of the closest approach between the permanent magnets 3 of the stator and the electromagnets of the rotor.

In accordance with the present invention, a plurality of metal screening elements 4 are provided in the electromagnetic motor. The screening elements 4 can be composed for example of steel. Each of the screening elements 4 is arranged forwardly of the front end of the permanent magnet 3 of the stator, as considered in direction of rotation. For example, the metal screening element 4 can be arranged at an angular direction of 0°–5° from the forward end of the permanent magnet of the stator.

The number of the groups of the electromagnets 2 of the rotor 1 can be selected from the formula N+1, wherein N is a number of permanent magnets of the stator. Optimal circumferential length of each group of the electromagnets 2 can be calculated from the following formula:

$$S° = 360°/N - 360°/(N+1)$$

Each group of the electromagnets 2 of the rotor 1 is supplied with current when it passes the point of the maximum proximity between the core of the electromagnet of the rotor 1 and the permanent magnet 3 of the stator. At this moment the electromagnet of the group of the electromagnets 2 provides a pulse, pushing against the permanent magnet 3 of the stator and attracted to the metal screening element 4 next to the permanent magnet 3 of the stator. The electromagnets within each group of electromagnets 2 are supplied with current sequentially. The electromagnet group 2 remains in this point until it leaves the interaction area with the permanent magnet of the stator. At this moment, a next group of the electromagnets 5 enters the same area of the next permanent magnet 3 of 5 the stator, and the process repeats. The metal screening element 4 of the stator acts as a screen, so that when the current supply to the group of electromagnets 2 is interrupted, the core of the electromagnet is not attracted to the permanent magnet of the stator, and the rotor rotates further in direction of rotation.

Because of the special relation between the number of the electromagnet groups 2 of the rotor and the permanent magnets 3 of the stator, only one group of the electromagnets of the rotor enters the area of the maximum approach of the electromagnet group to the permanent magnet of the stator at the same time. The strictly prescribed order of entering the above mentioned area is important feature of the present invention. In the drawings, the next group of electromagnets entering the area is 5, then 6, 7, 8, 9, 10, etc.

The number of the electromagnets in each group can be 1, 2, 3, and more. They are arranged near one another in circumferential direction. The groups of the electromagnets are supplied with current sequentially, and the electromagnets of each group are also supplied with current sequentially one after another. At this moment the electromagnet of the group of electromagnets 2 provides a pulse, pushing against the permanent magnet 3 of the stator and attracted to the metal screening element 4 next to the permanent magnet 3 of the stator. The electromagnets within each group of electromagnets 2 are supplied with current sequentially.

In the electromagnetic motor in accordance with the present invention, the full power of the potential energy of the permanent magnets is utilized, therefore the efficiency of the motor is increased.

It will be understood that each of the elements described above, or two or more together, may also find a useful application in other types of constructions differing from the types described above.

While the invention has been illustrated and described as embodied in electromagnetic motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electromagnetic motor, comprising a rotor rotatable about an axis and having a plurality of electromagnets arranged on its periphery and spaced from one another in a peripheral direction; a stator surrounding said rotor and including a plurality of permanent magnets spaced from one another in a peripheral direction and also spaced from an outer surface of said rotor so that a distance between each of said permanent magnets of said stator and said outer surface of said rotor decreases in direction of rotation of said rotor; and a plurality of metal screening elements each located forwardly of a front end of each permanent magnets of said stator as considered in direction of rotation of said rotor, each of said permanent magnets of said stator having a distance from an outer surface of said rotor which decreases in the direction of rotation of said rotor, each of said permanent magnets of said stator having a side facing said rotor and forming one pole and a side facing away from said rotor and forming a another pole, each of said electromagnets of said rotor having an axis extending substantially radially and substantially perpendicularly to the outer surface of said rotor, each of said electromagnets including two electromagnet elements located near one another in a direction of rotation of said rotor and each having an axis extending substantially radially and substantially perpendicular to the outer surface of said rotor.

2. An electromagnetic motor as defined in claim 1, wherein said metal screening elements are composed of a material selected from the group consisting of steel and iron.

3. An electromagnetic motor as defined in claim 1, wherein said permanent magnets are formed so that when one of said electromagnets of said rotor passes said forward end of a respective of one of said permanent magnets of said stator and a current supply is withdrawn from said one electromagnet, said one electromagnet is not attracted to said forward end of said permanent magnet, since said forward end of said permanent magnet is screened by said metal screening element.

\* \* \* \* \*